(12) United States Patent
Lee et al.

(10) Patent No.: US 12,123,758 B2
(45) Date of Patent: Oct. 22, 2024

(54) FLOW SENSOR PERFORMING MULTI LEVEL DOWN SAMPLING AND METHOD THEREOF

(71) Applicant: ELECTRONICS AND TELECOMMUNICATIONS RESEARCH INSTITUTE, Daejeon (KR)

(72) Inventors: Sung Q Lee, Daejeon (KR); Joho Yun, Daejeon (KR); Chang Han Je, Daejeon (KR); Gunn Hwang, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 518 days.

(21) Appl. No.: 17/546,439

(22) Filed: Dec. 9, 2021

(65) Prior Publication Data

US 2022/0251948 A1   Aug. 11, 2022

(30) Foreign Application Priority Data

Feb. 9, 2021  (KR) .......................... 10-2021-0018099

(51) Int. Cl.
  *G01F 1/663* (2022.01)
  *G01F 1/66* (2022.01)
(52) U.S. Cl.
  CPC .............. *G01F 1/663* (2013.01); *G01F 1/662* (2013.01)
(58) Field of Classification Search
  CPC .................................. G01F 1/662; G01F 1/663
  (Continued)

(56) References Cited

U.S. PATENT DOCUMENTS 5,065,764 A * 11/1991 Nakamura ............ G01S 15/582
   600/455
5,078,146 A *  1/1992 Sato .................... G01S 7/52085
   600/440

(Continued)

FOREIGN PATENT DOCUMENTS

EP      0794411 A2     9/1997
JP   H11142425 A  *   5/1999
(Continued)

OTHER PUBLICATIONS

Translation of JP-H11142425-A (Year: 1999).*

*Primary Examiner* — Nathaniel T Woodward
(74) *Attorney, Agent, or Firm* — Rabin & Berdo, P.C.

(57) ABSTRACT

Disclosed is a method of operating a flow sensor according to an embodiment of the present disclosure, which includes receiving an ultrasonic signal reflected from a particle, generating first and second digital, generating a first Doppler frequency based on the first and second digital signals, a predetermined number of samples, and a first time period, comparing the first Doppler frequency with a second reference frequency, when the first Doppler frequency is less than a first reference frequency, down-sampling the predetermined number of samples to a first sampling frequency or a second sampling frequency, generating a second Doppler frequency based on the first and second digital signals, the number of down-sampled samples, and a second time period determining an output frequency based on the second Doppler frequency when the first Doppler frequency is less than a first reference frequency, and obtaining flow information of the particle based on the output frequency.

14 Claims, 11 Drawing Sheets

(58) Field of Classification Search
USPC ........................................................ 73/861.18
See application file for complete search history.

(56) References Cited

U.S. PATENT DOCUMENTS

| | | |
|---|---|---|
| 6,606,571 B2 | 8/2003 | Phelan et al. |
| 6,669,642 B2 | 12/2003 | Amemiya et al. |
| 2006/0277238 A1 | 12/2006 | Heeb |
| 2013/0041600 A1* | 2/2013 | Rick ..................... G01F 1/002 |
| | | 702/50 |
| 2015/0226848 A1 | 8/2015 | Park |
| 2019/0190767 A1 | 6/2019 | Kim |

FOREIGN PATENT DOCUMENTS

| | | |
|---|---|---|
| JP | 3847124 B2 | 11/2006 |
| JP | 2012058186 A | 3/2012 |
| KR | 100483783 B1 | 4/2005 |
| KR | 1020120060415 A | 6/2012 |
| KR | 102030340 B1 | 10/2019 |

* cited by examiner

FLOW SENSOR PERFORMING MULTI LEVEL DOWN SAMPLING AND METHOD THEREOF

CROSS-REFERENCE TO RELATED APPLICATIONS

This application claims priority under 35 U.S.C. § 119 to Korean Patent Application No. 10-2021-0018099, filed on Feb. 9, 2021, in the Korean Intellectual Property Office, the disclosures of which are incorporated by reference herein in their entireties.

BACKGROUND

Embodiments of the present disclosure described herein relate to a flow sensor, and more particularly, relate to a flow sensor that performs a multiple level down sampling, and an operating method thereof.

Various devices for measuring a flow in waterways, rivers, and oceans using ultrasonic waves are being developed and marketed, they mainly use a time difference method based on a difference in arrival time of ultrasonic signals, or use a phase difference method based on a correlation of signals. When a phase is derived through the correlation of the signals, a rate corresponding to the phase is obtained. However, according to this method, when the flow rate is fast, the measurement time is short, but when the flow rate is slow, it takes a long time to determine after acquiring data for a certain period of time.

According to a Doppler technique using a pulse repetition frequency, a measurable distance or a flow rate measurement range varies depending on the used pulse repetition frequency. As the pulse repetition frequency increases, the measurement distance becomes shorter, and as the pulse repetition frequency decreases, the measurable speed range becomes narrow. The flow rate in some waterways or rivers may have a value between about 0.001 m/sec and 7.5 m/sec. Resolution of 14 bits or more is required to measure the flow rate having an error less than a reference in this range, but the time required for calculation increases in proportion to the increase in resolution.

SUMMARY

Embodiments of the present disclosure provide a flow sensor and a method thereof that perform a multiple level down sampling with improved accuracy and improved calculation speed.

According to an embodiment of the present disclosure, a method of operating a flow sensor includes receiving an ultrasonic signal reflected from a particle, generating first and second digital signals based on the ultrasonic signal, generating a first Doppler frequency based on the first and second digital signals, a predetermined number of samples, and a first time period, comparing the first Doppler frequency with a second reference frequency less than the first reference frequency, when the first Doppler frequency is less than a first reference frequency, down-sampling the predetermined number of samples to a first sampling frequency or a second sampling frequency greater than the first sampling frequency, based on a result of the comparison, generating a second Doppler frequency based on the first and second digital signals, the number of down-sampled samples, and a second time period longer than the first time period, determining an output frequency based on the second Doppler frequency when the first Doppler frequency is less than a first reference frequency, and obtaining flow information of the particle based on the output frequency.

According to an embodiment, the down-sampling of the predetermined number of samples to the first sampling frequency or the second sampling frequency greater than the first sampling frequency, based on the result of the comparison may include determining whether the first Doppler frequency is greater than or equal to the second reference frequency, down-sampling the predetermined number of samples to the first sampling frequency when it is determined that the first Doppler frequency is greater than or equal to the second reference frequency, and down-sampling the predetermined number of samples to the second sampling frequency when it is determined that the first Doppler frequency is less than the second reference frequency.

According to an embodiment, the method may further include determining the first Doppler frequency to the output frequency when the first Doppler frequency is greater than or equal to the first reference frequency.

According to an embodiment, the determining of the output frequency, based on the second Doppler frequency when the first Doppler frequency is less than the first reference frequency may include determining whether the second Doppler frequency is greater than or equal to the first reference frequency, and determining the second Doppler frequency as the output frequency when it is determined that the second Doppler frequency is greater than or equal to the first reference frequency.

According to an embodiment, the determining of the output frequency, based on the second Doppler frequency when the first Doppler frequency is less than the first reference frequency may include determining whether the second Doppler frequency is greater than or equal to the first reference frequency, comparing the second Doppler frequency with the second reference frequency when it is determined that the second Doppler frequency is less than the first reference frequency, further down-sampling the number of down-sampled samples to the first sampling frequency or the second sampling frequency, based on a result of the comparison of the second Doppler frequency, generating a third Doppler frequency based on the first and second digital signals, the number of further down-sampled samples, and a third time period longer than the second time period, and determining the third Doppler frequency as the output frequency when the second Doppler frequency is less than the first reference frequency.

According to an embodiment, the predetermined number of samples may be an integer multiple of the first sampling frequency and the second sampling frequency.

According to an embodiment, the generating of the first and second digital signals based on the ultrasonic signal may include generating the first digital signal based on an in-phase signal of the ultrasonic signal, and generating the second digital signal based on a quadrature phase signal of the ultrasonic signal.

According to an embodiment, the generating of the first digital signal based on the in-phase signal of the ultrasonic signal may further include removing a high-frequency component of the in-phase signal, and the generating of the second digital signal based on the quadrature phase signal of the ultrasonic signal may further include removing a high-frequency component of the quadrature phase signal.

According to an embodiment, the generating of the first Doppler frequency based on the first and second digital signals, the predetermined number of samples, and the first time period may include forming a complex number using the first and second digital signals, sampling the complex number with the predetermined number of samples, and generating the first Doppler frequency by fast Fourier transforming the sampled complex number.

According to an embodiment, the generating of the second Doppler frequency based on the first and second digital signals, the number of down-sampled samples, and a second time period longer than the first time period may include generating the second Doppler frequency based on samples corresponding to the second time period and dummy samples corresponding to a third time period after the second time period, and each of the dummy samples may have a specific value.

According to an embodiment of the present disclosure, a flow sensor includes a transceiver that receives an ultrasonic signal reflected from a particle, a signal processor that generates first and second digital signals based on the ultrasonic signal, a Doppler frequency calculator that generates an output frequency based on the first and second digital signals, and a flow rate calculator that obtains flow information of the particle based on the output frequency, and the Doppler frequency calculator further generates a first Doppler frequency based on the first and second digital signals, a predetermined number of samples, and a first time period, compares the first Doppler frequency with a second reference frequency less than the first reference frequency, when the first Doppler frequency is less than a first reference frequency, down-samples the predetermined number of samples to a first sampling frequency or a second sampling frequency greater than the first sampling frequency, based on a result of the comparison, generates a second Doppler frequency based on the first and second digital signals, the number of down-sampled samples, and a second time period longer than the first time period, and determines the output frequency based on the first and second Doppler frequencies.

According to an embodiment, the Doppler frequency calculator may further down-sample the predetermined number of samples to the first sampling frequency when the first Doppler frequency is less than the second reference frequency and is greater than or equal to the second reference frequency, and may further down-sample the predetermined number of samples to the second sampling frequency when the first Doppler frequency is less than the second reference frequency.

According to an embodiment, the Doppler frequency calculator may further determine the first Doppler frequency as the output frequency when the first Doppler frequency is greater than or equal to the first reference frequency, and may further determine the output frequency based on the second Doppler frequency when the first Doppler frequency is less than the first reference frequency.

According to an embodiment, when the first Doppler frequency is less than the first reference frequency, the Doppler frequency calculator may further determine whether the second Doppler frequency is greater than or equal to the first reference frequency, compare the second Doppler frequency with the second reference frequency when it is determined that the second Doppler frequency is less than the first reference frequency, further down-sample the number of down-sampled samples to the first sampling frequency or the second sampling frequency, based on a result of the comparison of the second Doppler frequency, generate a third Doppler frequency based on the first and second digital signals, the number of further down-sampled samples, and a third time period longer than the second time period, and determine the third Doppler frequency as the output frequency when it is determined that the second Doppler frequency is less than the first reference frequency.

BRIEF DESCRIPTION OF THE FIGURES

The above and other objects and features of the present disclosure will become apparent by describing in detail embodiments thereof with reference to the accompanying drawings.

DETAILED DESCRIPTION

Hereinafter, embodiments of the present disclosure will be described clearly and in detail such that those skilled in the art may easily carry out the present disclosure.

Figure 1:
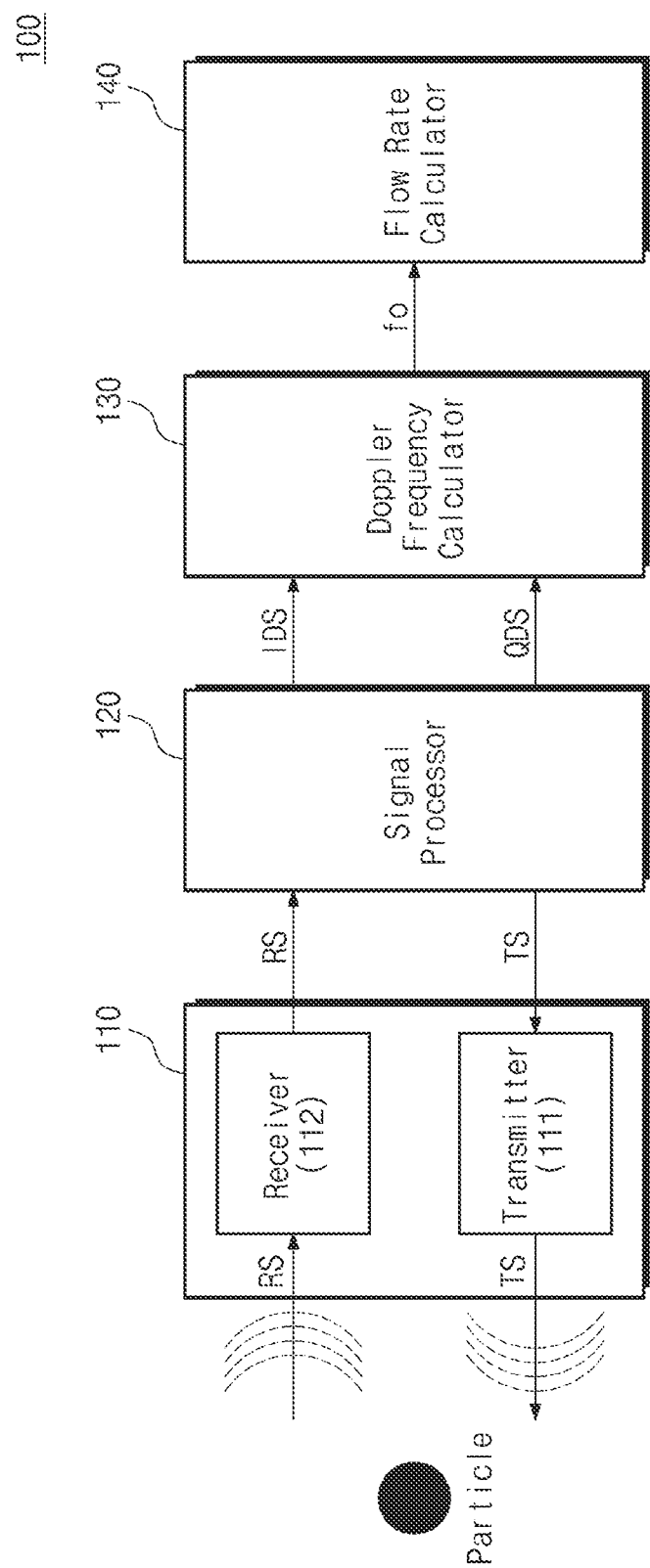
FIG. 1 is a block diagram illustrating a flow sensor according to an embodiment of the present disclosure.

FIG. 1 is a block diagram illustrating a flow sensor according to an embodiment of the present disclosure. Referring to FIG. 1, the flow sensor 100 may include a transceiver 110, a signal processor 120, a Doppler frequency calculator 130, and a flow rate calculator 140.

The flow sensor 100 may be a device that acquires flow rate information of a particle, based on a difference in frequency between an ultrasonic signal TS output to the particle and an ultrasonic signal RS reflected from the particle. The flow sensor 100 may be used to measure the flow rate information in waterways, rivers, oceans, etc. The flow sensor 100 may measure the flow rate information of particles floating in waterways, rivers, and oceans so as to measure the flow rate information of waterways, rivers, and oceans. The particle may refer to particles such as foreign matter, airborne dust, etc.

The transceiver 110 may include a transmitter 111 and a receiver 112. The transmitter 111 may output the ultrasonic signal TS to the particle, and the receiver 112 may receive the ultrasonic signal RS reflected from the particle. In detail, the transceiver 110 may be a unit that outputs the ultrasonic signal or receives the ultrasonic signal. The receiver 112 may include a plurality of receiving modules, and each receiving module may receive the reflected ultrasonic signal RS and may process it independently or in parallel. The ultrasonic signal TS may be a continuous wave or a pulse wave.

The signal processor 120 may generate a first digital signal IDS and a second digital signal QDS, based on the reflected ultrasonic signal RS. The Doppler frequency calculator 130 may perform the down sampling and at least one fast Fourier transform based on the first and second digital signals IDS and QDS to generate an output frequency fo. The flow rate calculator 140 may calculate the flow rate information of the particle, based on the output frequency fo. For example, the flow rate information may include a movement speed of the particle and a movement direction of the particle.

Figure 2:
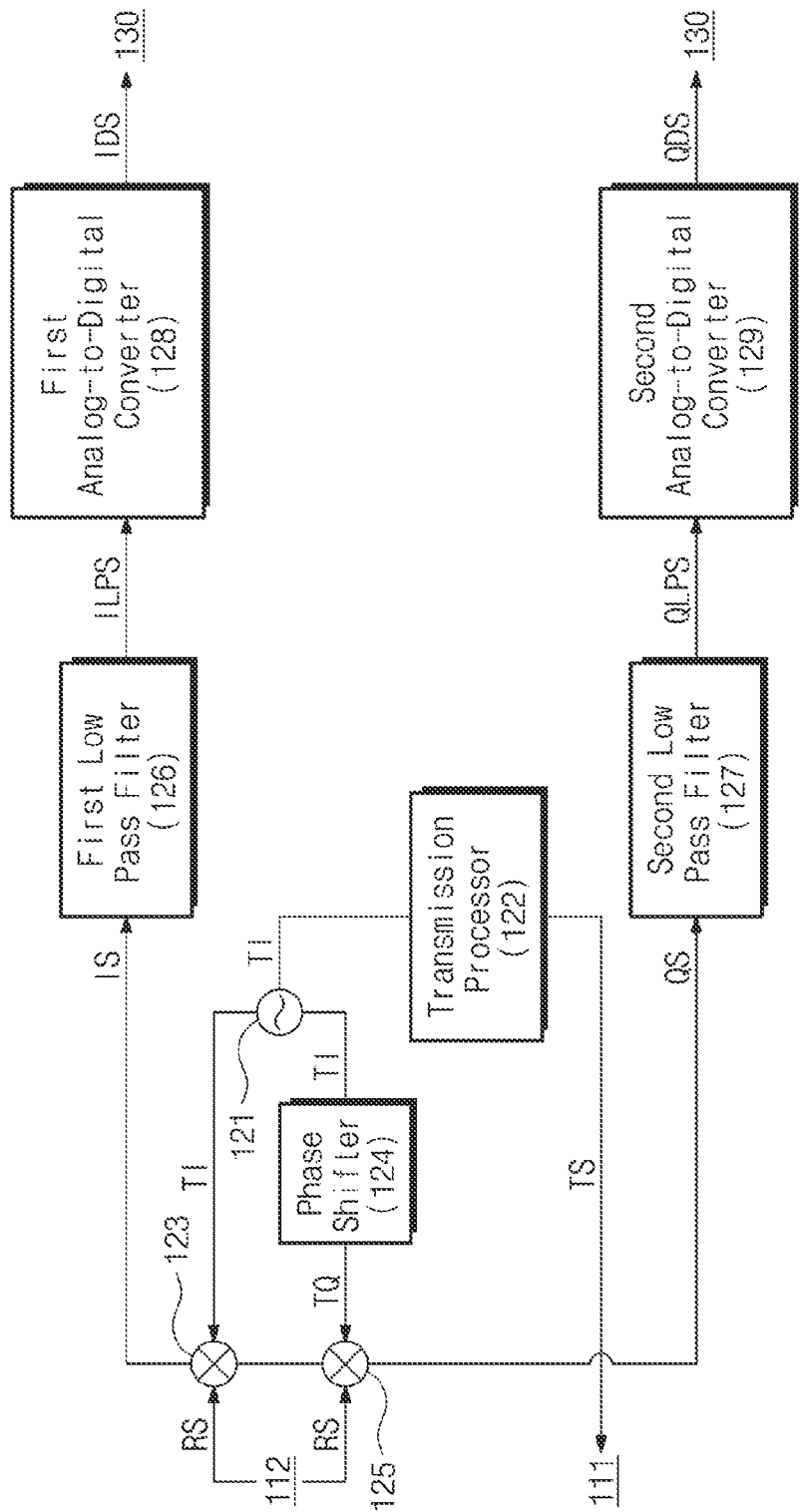
FIG. 2 is a block diagram embodying a signal processor of FIG. 1 according to some embodiments of the present disclosure.

FIG. 2 is a block diagram embodying a signal processor of FIG. 1 according to some embodiments of the present disclosure.

The signal processor 120 may include an oscillator 121, a transmission processor 122, a first mixer 123, a phase shifter 124, a second mixer 125, a first low pass filter 126, and a second low pass filter 127, a first analog-to-digital converter 128, and a second analog-to-digital converter 129.

The oscillator 121 may generate a first phase signal TI having an oscillation frequency. The transmission processor 122 may output the ultrasonic signal TS to the transmitter 111, based on the first phase signal TI. For example, the first phase signal TI may be a signal having the same phase as the ultrasonic signal TS. The oscillator 121 may transfer the first phase signal TI to the first mixer 123 and the phase shifter 124.

The first mixer 123 may generate a first analog signal IS by mixing the first phase signal TI and the reflected ultrasonic signal RS.

The phase shifter 124 may receive the first phase signal TI from the oscillator 121. The phase shifter 124 may generate a second phase signal TQ by shifting a phase of the first phase signal TI. A phase of the second phase signal TQ may be different from a phase of the first phase signal TI. For example, a phase difference between the second phase signal TQ and the first phase signal TI may be 90°.

The second mixer 125 may generate a second analog signal QS by mixing the second phase signal TQ and the reflected ultrasonic signal RS. In this case, a phase of the second analog signal QS may be different from a phase of the first analog signal IS. For example, a phase difference between the second analog signal QS and the first analog signal IS may be 90°.

The first low-pass filter 126 may remove a high frequency component of the first analog signal IS and output a first low pass signal ILPS to the first analog-to-digital converter 128. The second low pass filter 127 may remove the high frequency component of the second analog signal QS and may output a second low pass signal QLPS to the second analog-to-digital converter 129. The first and second low pass filters 126 and 127 remove high-frequency components of the first and second analog signals IS and QS, so that during analog-to-digital conversion in the first and second analog-to-digital converters 128 and 189, errors due to high frequency noise may be reduced.

The first mixer 123 and the first low pass filter 126 may be integrally implemented. For example, the first mixer 123 and the first low pass filter 126 may be implemented as a digital FIR (Finite Impulse Response) filter. The digital FIR filter may be a device that non-recursively filters an impulse input having finite length. The second mixer 125 and the second low pass filter 127 may be integrally implemented. For example, the second mixer 125 and the second low pass filter 127 may be implemented as the digital FIR filter.

The first analog-to-digital converter 128 may generate the first digital signal IDS based on the first low pass signal ILPS. The first digital signal IDS may be a digital signal having information corresponding to the first analog signal IS. The first analog-to-digital converter 128 may output the first digital signal IDS to the Doppler frequency calculator 130.

The second analog-to-digital converter 129 may generate the second digital signal QDS based on the second low pass signal QLPS. The second digital signal QDS may be a digital signal having information corresponding to the second analog signal QS. The second analog-to-digital converter 129 may output the second digital signal QDS to the Doppler frequency calculator 130.

Figure 3:
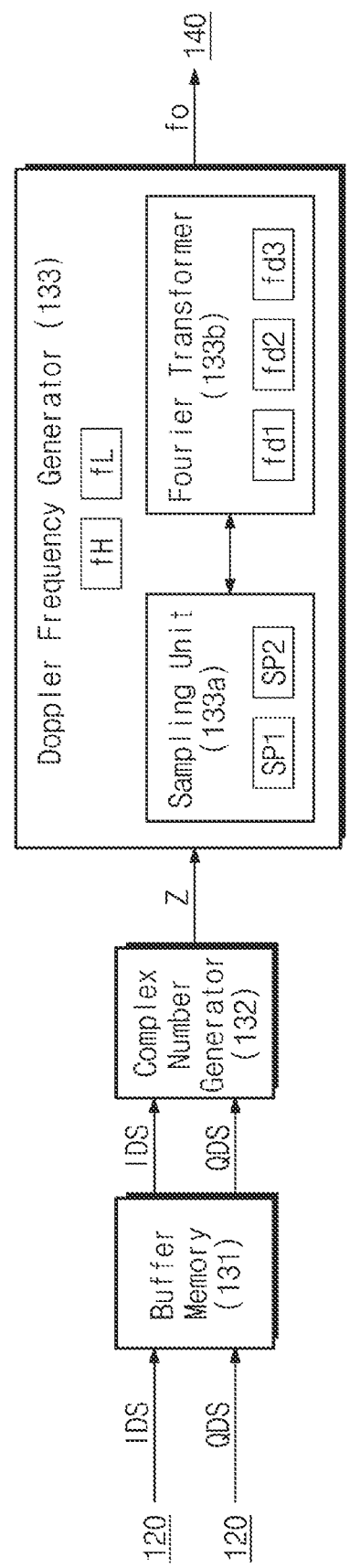
FIG. 3 is a block diagram embodying a Doppler frequency calculator of FIG. 1 according to some embodiments of the present disclosure.

FIG. 3 is a block diagram embodying a Doppler frequency calculator of FIG. 1 according to some embodiments of the present disclosure.

The Doppler frequency calculator 130 may generate the output frequency fo based on the first and second digital signals IDS and QDS. The Doppler frequency calculator 130 may include a buffer memory 131, a complex number generator 132, and a Doppler frequency generator 133.

The buffer memory 131 may receive the first and second digital signals IDS and QDS from the signal processor 120. The buffer memory 131 may store the first and second digital signals IDS and QDS. The complex number generator 132 may receive the first and second digital signals IDS and QDS from the buffer memory 131. The complex number generator 132 may generate a complex number 'Z' based on the first and second digital signals IDS and QDS. The complex number Z is a value generated based on the ultrasonic signal reflected from the particle, and may have values of a real component and an imaginary component over time.

The Doppler frequency generator 133 may receive the complex number Z from the complex number generator 132. The Doppler frequency generator 133 may generate the output frequency fo based on the complex number Z. The Doppler frequency generator 133 may include a sampling unit 133a and a Fourier transformer 133b. The sampling unit 133a may sample the complex number Z with a predetermined number of samples during a first time period. The Fourier transformer 133b may perform the fast Fourier transform on the sampled complex number Z and generate the output frequency fo.

In other words, the Doppler frequency generator 133 may generate a first Doppler frequency fd1 by performing the Fast Fourier Transform (FFT) on the complex number Z, based on the predetermined number of samples and the first time period. The predetermined number of samples may mean the number of samples to be sampled from the complex number Z for the fast Fourier transform. The first Doppler frequency fd1 may be a Doppler frequency having a maximum magnitude among Doppler frequencies obtained by the fast Fourier transform.

In some embodiments, the sampling unit 133a may downsample the predetermined number of samples with a first sampling frequency SP1 or a second sampling frequency SP2. For example, the sampling unit 133a may divide the predetermined number of samples by the first sampling frequency SP1 or the second sampling frequency SP2. In some embodiments, the second sampling frequency SP2 may be greater than the first sampling frequency SP1. In some embodiments, the predetermined number of samples may be an integer multiple of the first sampling frequency SP1 and the second sampling frequency SP2.

According to an embodiment of the present disclosure, the Doppler frequency generator 133 compares the first Doppler frequency fd1 with a first reference frequency fH and a second reference frequency fL, and a sampling operation may vary depending on a result of the comparison. The first reference frequency fH may be greater than the second reference frequency fL. The first reference frequency fH may be a frequency obtained by dividing the number of sampling times (or sampling frequency) per unit time by a first reference value (e.g., 20). The second reference frequency fL may be a frequency obtained by dividing the number of sampling times per unit time by a second reference value (e.g., 200).

Hereinafter, for convenience of description, a case in which the first Doppler frequency fd1 is greater than or equal to the first reference frequency fH is referred to as a first case, a case in which the first Doppler frequency fd1 is less than the first reference frequency fH and greater than or equal to the second reference frequency fL is referred to as a second case, and a case in which the first Doppler frequency fd1 is less than the second reference frequency fL is referred to as a third case.

In some embodiments of the present disclosure, when the first Doppler frequency fd1 corresponds to the first case, the Doppler frequency generator 133 may determine the first Doppler frequency fd1 as the output frequency fo. In this case, the first Doppler frequency fd1 may be a value generated by fast Fourier transforming the complex number Z, based on the predetermined number of samples and the first time period.

In some embodiments of the present disclosure, when the first Doppler frequency fd1 corresponds to the second case, the sampling unit 133a may down-sample the predetermined number of samples with the first sampling frequency SP1. The Fourier transformer 133b may generate a second Doppler frequency fd2 by fast Fourier transforming the complex number Z, based on the number of samples down-sampled to the first sampling frequency SP1 and a second time period. The second Doppler frequency fd2 may be a Doppler frequency having a maximum magnitude among the Doppler frequencies obtained by the fast Fourier transform. In some embodiments, the Doppler frequency generator 133 may determine the second Doppler frequency fd2 as the output frequency fo.

In some embodiments of the present disclosure, when the first Doppler frequency fd1 corresponds to the third case, the sampling unit 133a may down-sample the predetermined number of samples with the second sampling frequency SP2. The Fourier transformer 133b may generate the second Doppler frequency fd2 by fast Fourier transforming the complex number Z, based on the number of samples down-sampled to the second sampling frequency SP2 and the second time period. The second Doppler frequency fd2 may be a Doppler frequency having a maximum magnitude among the Doppler frequencies obtained by the fast Fourier transform. In some embodiments, the Doppler frequency generator 133 may determine the second Doppler frequency fd2 as the output frequency fo.

In some embodiments, a further down sampling may be performed after generating the second Doppler frequency fd2 in the second case and the third case.

For example, when the second Doppler frequency fd2 is less than the first reference frequency fH and greater than or equal to the second reference frequency fL, the sampling unit 133a may further down-sample the number of down-sampled samples to the first sampling frequency SP1. For example, when the second Doppler frequency fd2 is less than the second reference frequency fL, the sampling unit 133a may further down-sample the number of down sampled samples to the second sampling frequency SP2.

The Fourier transformer 133b may generate a third Doppler frequency fd3 by fast Fourier transforming the complex number Z, based on based on the first and second digital signals IDS and QDS, the number of further down-sampled samples, and a third time period longer than the second time period. The third Doppler frequency fd3 may be a Doppler frequency having a maximum magnitude among the Doppler frequencies obtained by the fast Fourier transform. When the second Doppler frequency fd2 is less than the second reference frequency fL, the Doppler frequency generator 133 may determine third Doppler frequency fd3 as the output frequency fo.

In some embodiments, when the number of down-sampled samples is less than the predetermined number of samples, the Fourier transformer 133b may perform the fast Fourier transform by adding dummy samples having a specific value (e.g., 0). The second Doppler frequency fd2 may be generated based on the down-sampled sample and the dummy samples. The number of dummy samples may be determined by subtracting the number of down-sampled samples from the predetermined number of samples.

In some embodiments, the first sampling frequency SP1 and the second sampling frequency SP2 may be predetermined based on the predetermined number of samples. For example, the predetermined number of samples may be 100,000, the first sampling frequency SP1 may be 10, and the second sampling frequency SP2 may be 100. In another example, the predetermined number of samples may be 256, the first sampling frequency SP1 may be 2, and the second sampling frequency SP2 may be 4. In another example, the predetermined number of samples may be 512, the first sampling frequency SP1 may be 16, and the second sampling frequency SP2 may be 64. However, the present disclosure is not limited thereto, and each of the predetermined number of samples, the first sampling frequency SP1, and the second sampling frequency SP2 may increase or decrease in various ways according to embodiments.

In some embodiments, the Doppler frequency generator 133 may repeat the fast Fourier transform and the down sampling until a Doppler frequency greater than or equal to the first reference frequency fH is obtained, and may determine the Doppler frequency greater than or equal to the first reference frequency fH as the output frequency fo.

Figure 4:
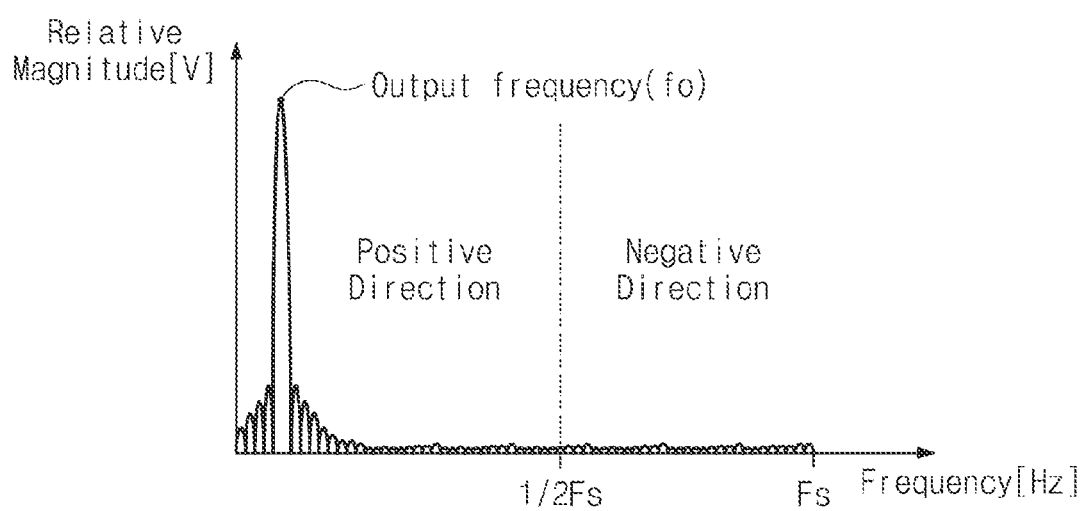
FIG. 4 is a graph embodying an output frequency of FIG. 1 according to some embodiments of the present disclosure.

FIG. 4 is a graph embodying the output frequency fo of FIG. 1 according to some embodiments of the present disclosure. Referring to FIGS. 1 and 4, the output frequency fo may be a Doppler frequency having a maximum magnitude among the Doppler frequencies that are generated by down-sampled according to the first, second, and third cases and generated by fast Fourier transformed based on the first and second digital signals, by the Doppler frequency generator.

The flow rate calculator 140 may obtain the flow rate information of the particle, based on the output frequency fo. When the output frequency fo is less than a Nyquist frequency, the flow rate of the particle may be determined to have a positive value. When the output frequency fo is greater than the Nyquist frequency, the flow rate of the particle may be determined to have a negative value. When the output frequency fo is equal to the Nyquist frequency, it may be determined that the particle does not move. The Nyquist frequency may mean a value obtained by dividing the number of sampling times Fs (sampling frequency) per unit time by two.

A flow rate Vs of the particles is described with reference to Equation 1 below.

$$V_\varepsilon = -\frac{fo}{fi}c.\quad\text{[Equation 1]}$$

Equation 1 is an equation representing the flow rate of the particle. 'Vs' is the flow rate of the particle. 'fo' is the output frequency generated based on an ultrasonic wave reflected from the particle. The output frequency fo may be a value obtained by sampling and Fourier transforming a complex number corresponding to the reflected ultrasonic. 'Fi' is the frequency of the ultrasonic signal output by the flow sensor to the particle. 'c' is a velocity of the ultrasonic signal in the water where the particle is located.

Figure 5:
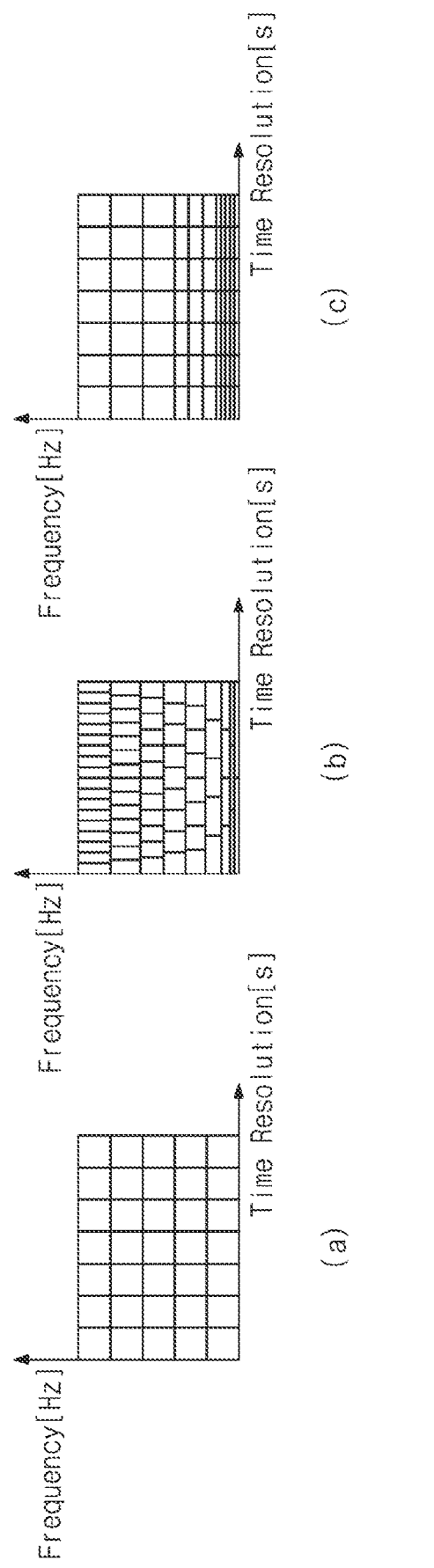
FIG. 5 is graphs illustrating a performance of a flow sensor and a conventional flow sensor, according to an embodiment of the present disclosure.

FIG. 5 is graphs illustrating a performance of a flow sensor and a conventional flow sensor, according to an embodiment of the present disclosure. Referring to FIG. 5, a graph (a), a graph (b), and a graph (c) are illustrated.

The graph (a) indicates a typical fast Fourier transform analysis method. A frequency resolution is determined by dividing the sampling frequency by the number of samples. In this case, as the size of the number of samples increases, the frequency resolution increases, but a calculation time for performing the fast Fourier transform increases at a rate of O(N log N). For example, when N=1,000, it is O(6.9), and when N=10,000, it is O(92.1), which takes a long time to calculate by 13.3 times.

The graph (b) indicates a general wavelet analysis method. This method is a method of down sampling using already obtained data, and is a method in which analysis is performed with a high sampling frequency at high frequencies and with a low sampling frequency at low frequencies. It is difficult to analyze the low frequency component in the fast Fourier transform analysis method, but the low frequency component may be easily analyzed in the wavelet analysis method. However, in the case of wavelet analysis, since information of a long time is required, so as to process it in real time, it is necessary to use a past value. That is, it is difficult to distinguish between the present and the past components, so that the temporal resolution is lowered.

The graph (c) indicates an analysis method according to an embodiment of the present disclosure. According to an embodiment of the present disclosure, the fast Fourier transform is performed by fixing the number of samples, but the sampling frequency of the multiple levels may be determined based on the obtained maximum value of the Doppler frequency. In addition, the down sampling is performed based on the sampling frequency, and the fast Fourier transform is performed based on the number of down-sampled samples. When the fast Fourier transform analysis method is used with a value having such multiple levels of sampling, since when the Doppler frequency is large, it has a large frequency resolution, and since when the Doppler frequency is small, it has a small frequency resolution, it is possible to measure the flow rate having a uniform error regardless of the size of the flow rate.

Figure 6:
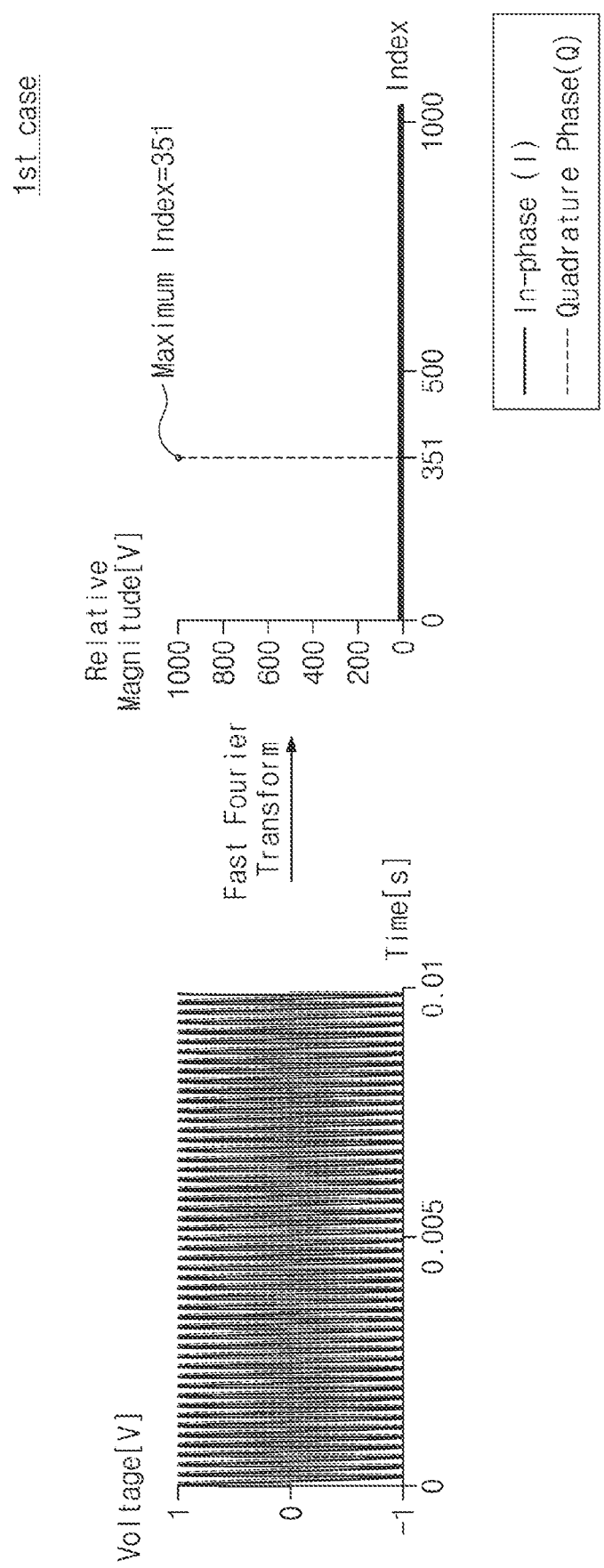
FIG. 6 is a diagram describing a fast Fourier transform in a first case according to an embodiment of the present disclosure.

FIG. 6 is a diagram describing a fast Fourier transform in a first case according to an embodiment of the present disclosure. Referring to FIG. 6, for better understanding of the embodiment of the present disclosure, it is assumed that the frequency difference according to the flow rate is 35 kHz, but the scope of the present disclosure is not limited thereto.

In one embodiment, when assuming that the predetermined number of samples is 1000 and the sampling frequency is 100 kHz, the first time period is 0.01 seconds (=1000/100*103), and the frequency resolution becomes 100 Hz (sampling frequency/predetermined number of samples). The sampling frequency is the number of sampling times per unit time.

When the flow sensor performs the fast Fourier transform on the sampled value (for example, a value obtained by sampling a complex number corresponding to the first and second digital signals with a predetermined number of samples), based on the first and second digital signals, the predetermined number of samples, and the first time period, an index of the first Doppler frequency becomes 351. The index multiplied by the frequency resolution may be referred to as a frequency indicated by the index. However, since the index starts from 0, the frequency indicated by the 351 index represents 35.0 kHz ((351-1)*100). That is, the first Doppler frequency is 35.0 kHz. Since the entire measurement range is 50 kHz (i.e., the sampling frequency divided by 2) and the frequency resolution is 100 Hz, the error range is 0.2% (more specifically, 100/50*103).

Figure 7:
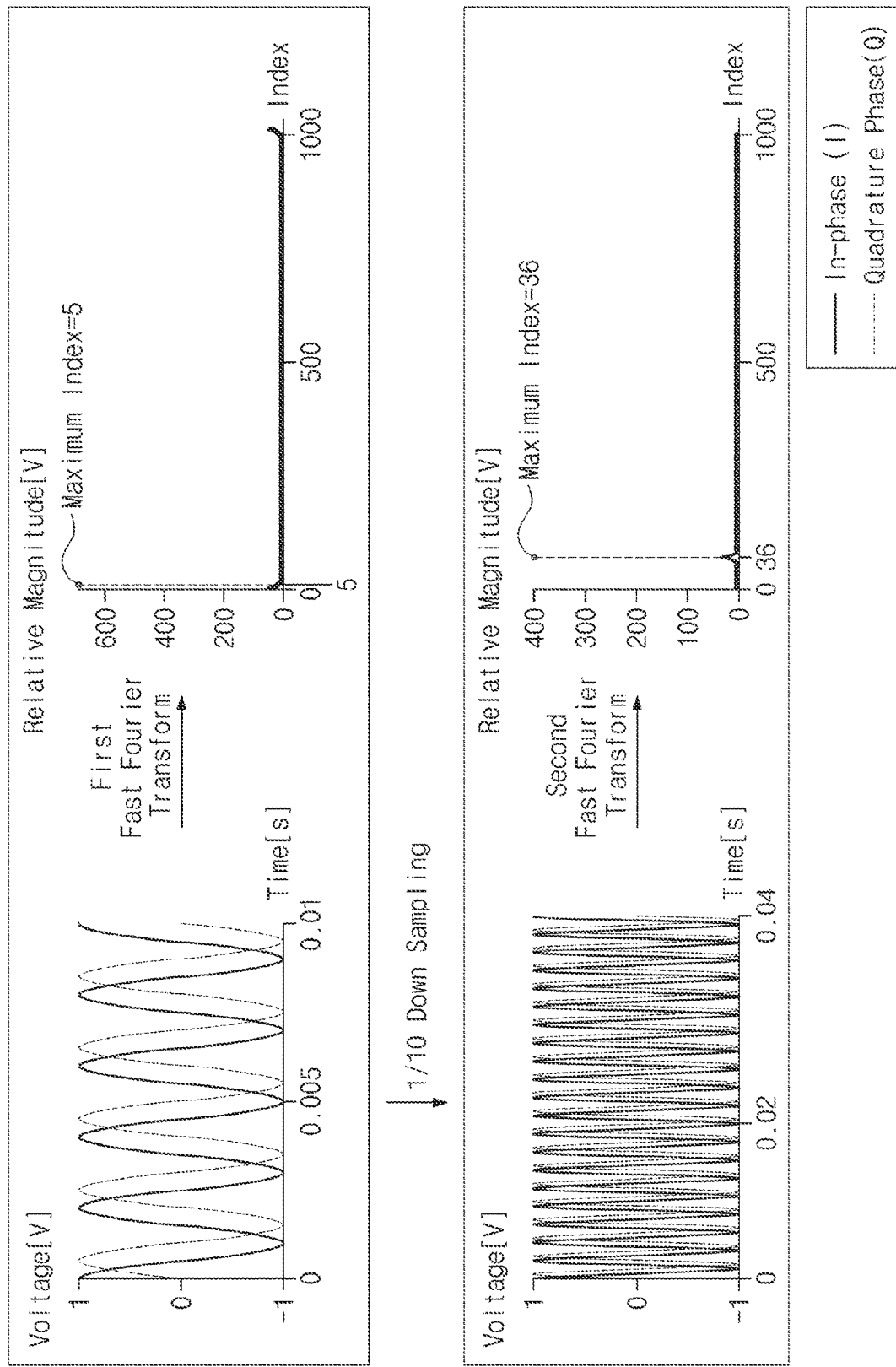
FIG. 7 is a diagram describing a fast Fourier transform and a down sampling in a second case according to an embodiment of the present disclosure.

FIG. 7 is a diagram describing a fast Fourier transform and a down sampling in a second case according to an embodiment of the present disclosure. Referring to FIG. 7, for better understanding of the embodiment of the present disclosure, it is assumed that the frequency difference according to the flow rate is 350 Hz, but the scope of the present disclosure is not limited thereto.

In one embodiment, when assuming that the predetermined number of samples is 1000 and the sampling frequency is 100 kHz, the first time period is 0.01 seconds (=1000/100*103), and the frequency resolution becomes 100 Hz (sampling frequency/predetermined number of samples). The sampling frequency is the number of sampling times per unit time.

When the flow sensor performs the fast Fourier transform on the sampled values based on the first and second digital signals, the predetermined number of samples, and the first time period, an index of the first Doppler frequency becomes '5'. Since the first Doppler frequency is 400 Hz, the error is large compared to the actual 350 Hz.

When the down sampling is performed assuming that the first sampling frequency is 10, the number of down-sampled samples is 400, the sampling frequency is 10 kHz, the frequency resolution is 10 Hz, and the second time period is 0.04 seconds. In this case, 600 samples that are insufficient among the predetermined number of samples (1000 samples) may be filled with dummy samples to perform the fast Fourier transform. The value of the dummy samples may be '0'. The third time period in which the dummy samples are present is 0.06 seconds. When the fast Fourier transform is performed based on the first and second digital signals, the number of down-sampled samples, the number of dummy samples, the second time period, and the third time period, the index of the second Doppler frequency becomes 36.

That is, the second Doppler frequency becomes 350 Hz, and has an error range of 0.2% considering the measurement range of 5 kHz, thereby providing an error range similar to the case of FIG. 6.

Figure 8:
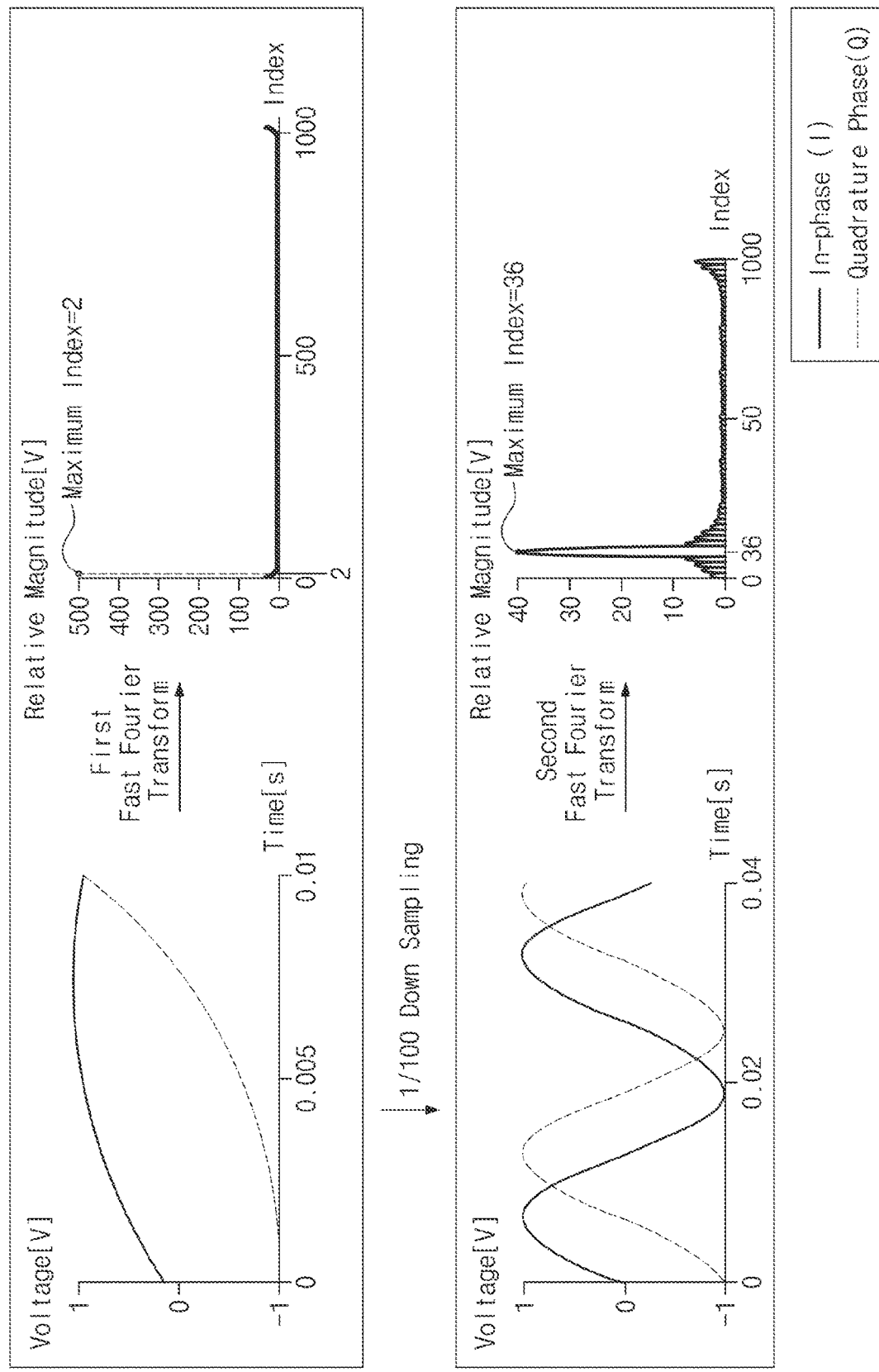
FIG. 8 is a diagram describing a fast Fourier transform and a down sampling in a third case according to an embodiment of the present disclosure.

FIG. 8 is a diagram describing a fast Fourier transform and a down sampling in a third case according to an embodiment of the present disclosure. Referring to FIG. 8, for better understanding of the embodiment of the present disclosure, it is assumed that the frequency difference according to the flow rate is 35 Hz, but the scope of the present disclosure is not limited thereto.

In one embodiment, when assuming that the predetermined number of samples is 1000 and the sampling frequency is 100 kHz, the first time period is 0.01 seconds (=1000/100*103), and the frequency resolution becomes 100 Hz (sampling frequency/predetermined number of samples). The sampling frequency is the number of sampling times per unit time.

When the flow sensor performs the fast Fourier transform on the sampled values based on the first and second digital signals, the predetermined number of samples, and the first time period, an index of the first Doppler frequency becomes '2'. Since the first Doppler frequency is 100 Hz, the error is large compared to the actual 35 Hz.

When the down sampling is performed assuming that the second sampling frequency is 100, the number of down-sampled samples is 40, the sampling frequency is 1 kHz, the frequency resolution is 10 Hz, and the second time period is 0.04 seconds. In this case, 960 samples that are insufficient among the predetermined number of samples (1000 samples) may be filled with dummy samples to perform the fast Fourier transform. The value of the dummy samples may be '0'. The time period corresponding to the dummy samples is 0.06 seconds. When the fast Fourier transform is performed based on the first and second digital signals, the number of down-sampled samples, the number of dummy samples, the second time period, and the time period corresponding to the dummy sample, the index of the second Doppler frequency becomes 36.

That is, the second Doppler frequency becomes 35 Hz, and has an error range of 0.2% considering the measurement range of 500 Hz, thereby providing the same error range as in the case of FIGS. 6 and 7.

Figure 9:
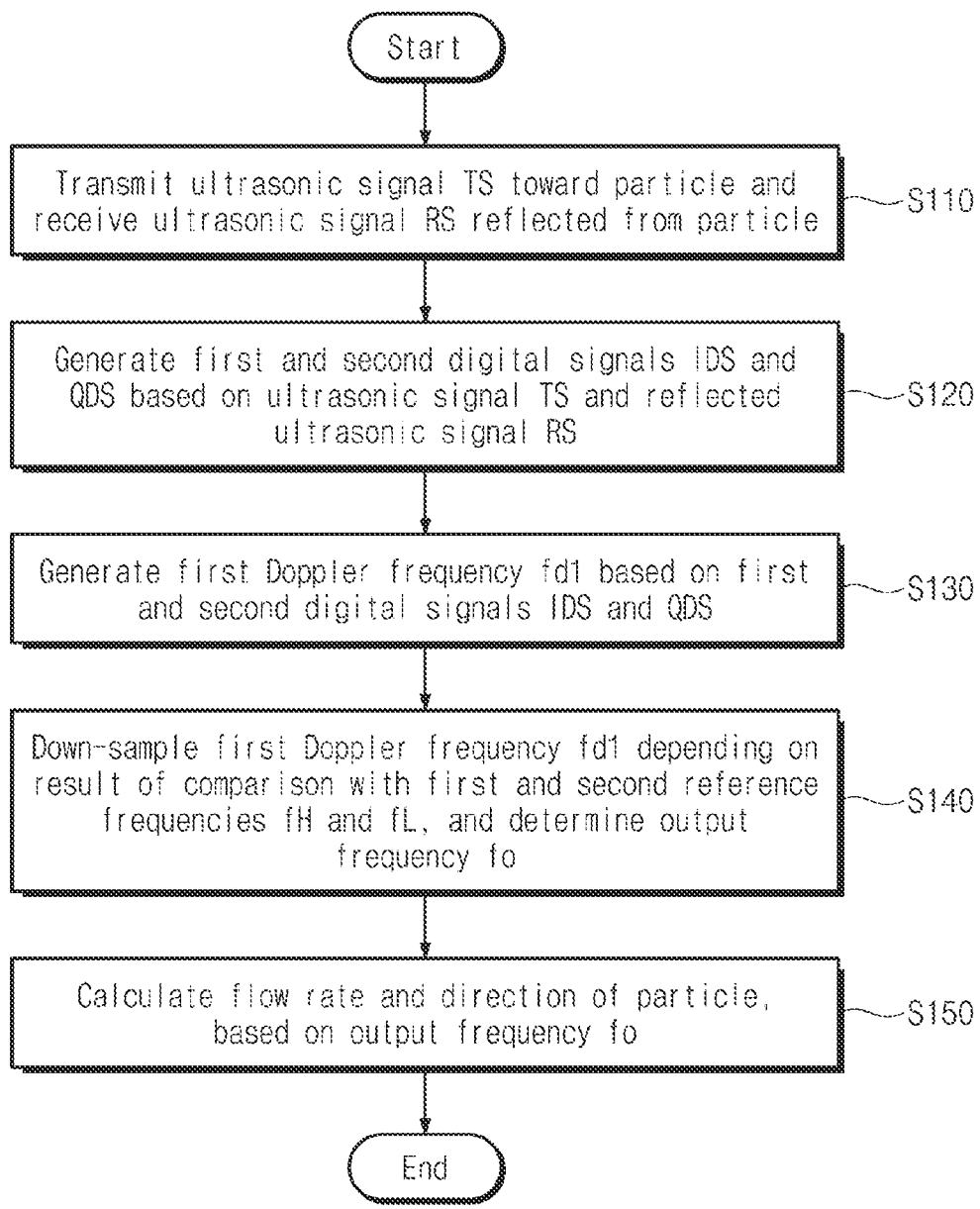
FIG. 9 is a flowchart illustrating an operating method of a flow sensor according to an embodiment of the present disclosure.

FIG. 9 is a flowchart illustrating an operating method of a flow sensor according to an embodiment of the present disclosure. Referring to FIG. 9, a method of operating a flow sensor is illustrated.

In operation S110, the flow sensor may transmit (or output) the ultrasonic signal TS toward the particle and receive the ultrasonic signal RS reflected from the particle. In some embodiments, the ultrasonic signal TS may be a continuous ultrasonic wave or a pulsed ultrasonic wave.

In operation S120, the flow sensor may generate first and second digital signals IDS and QDS based on the ultrasonic signal TS and the reflected ultrasonic signal RS. The first digital signal IDS may be a digital signal having information corresponding to the first analog signal IS. The second digital signal QDS may be a digital signal having information corresponding to the second analog signal QS. The first and second digital signals IDS and QDS may be stored in the flow sensor. The first analog signal IS may be a signal obtained by mixing an in-phase signal of the ultrasonic signal TS and the reflected ultrasonic signal RS. The second analog signal QS may be a signal obtained by mixing the quadrature phase signal of the ultrasonic signal TS and the reflected ultrasonic signal RS.

In an embodiment, in operation S120, the flow sensor may remove high-frequency components of the first analog signal IS and the second analog signal QS. The flow sensor may reduce an error when generating the first and second digital signals IDS and QDS by removing high-frequency components of the first and second analog signals IS and QS.

In operation S130, the flow sensor may generate the first Doppler frequency fd1 based on the first and second digital signals IDS and QDS. The flow sensor may generate a complex number based on the first and second digital signals IDS and QDS, and may sample the complex number with the predetermined number of samples. The flow sensor may perform the fast Fourier transform on the sampled complex number to generate the first Doppler frequency fd1.

The first Doppler frequency fd1 may be a Doppler frequency having a maximum magnitude among Doppler frequencies obtained by the fast Fourier transform. The complex number is a value generated based on the ultrasonic signal RS reflected from the particle, and may have values of a real component and an imaginary component over time. The predetermined number of samples may mean the number of samples to be sampled from the complex number 'Z' for the fast Fourier transform. The first Doppler frequency fd1 may be a Doppler frequency having a maximum magnitude among Doppler frequencies obtained by the fast Fourier transform. The predetermined number of samples may be an integer multiple of the first sampling frequency and the second sampling frequency.

In operation S140, the flow sensor may down-sample the first Doppler frequency fd1 depending on a result of comparison with the first and second reference frequencies fH and fL, and may determine the output frequency fo. When the first Doppler frequency fd1 is greater than or equal to the first reference frequency fH, the flow sensor may determine the first Doppler frequency fd1 as the output frequency fo. When the first Doppler frequency fd1 is less than the first reference frequency fH and greater than or equal to the second reference frequency fL, the flow sensor may down-sample the predetermined number of samples with the first sampling frequency SP1. In addition, when the first Doppler frequency fd1 is less than the second reference frequency fL, the flow sensor may down-sample the predetermined number of samples with the second sampling frequency SP2.

When the down sampling is performed, in operation S140, the flow sensor may generate the second Doppler frequency fd2 based on the first and second digital signals IDS and QDS, the number of down-sampled samples, and the second time period. The second Doppler frequency fd2 may be a Doppler frequency having a maximum magnitude among the Doppler frequencies obtained by the fast Fourier transform. Thereafter, the flow sensor may determine the second Doppler frequency fd2 as the output frequency fo.

In operation S150, the flow sensor may calculate the flow rate and the direction of the particle, based on the output frequency fo. In some embodiments, when the output frequency fo is less than a Nyquist frequency, the flow sensor may determine that the flow rate of the particle has a positive value. When the output frequency fo is greater than the Nyquist frequency, the flow sensor may determine that the flow rate of the particle has a negative value. The Nyquist frequency may mean a value obtained by dividing the number of sampling times Fs (sampling frequency) per unit time by two. The flow rate Vs of the particles is described with reference to Equation 1 above.

Figure 10:
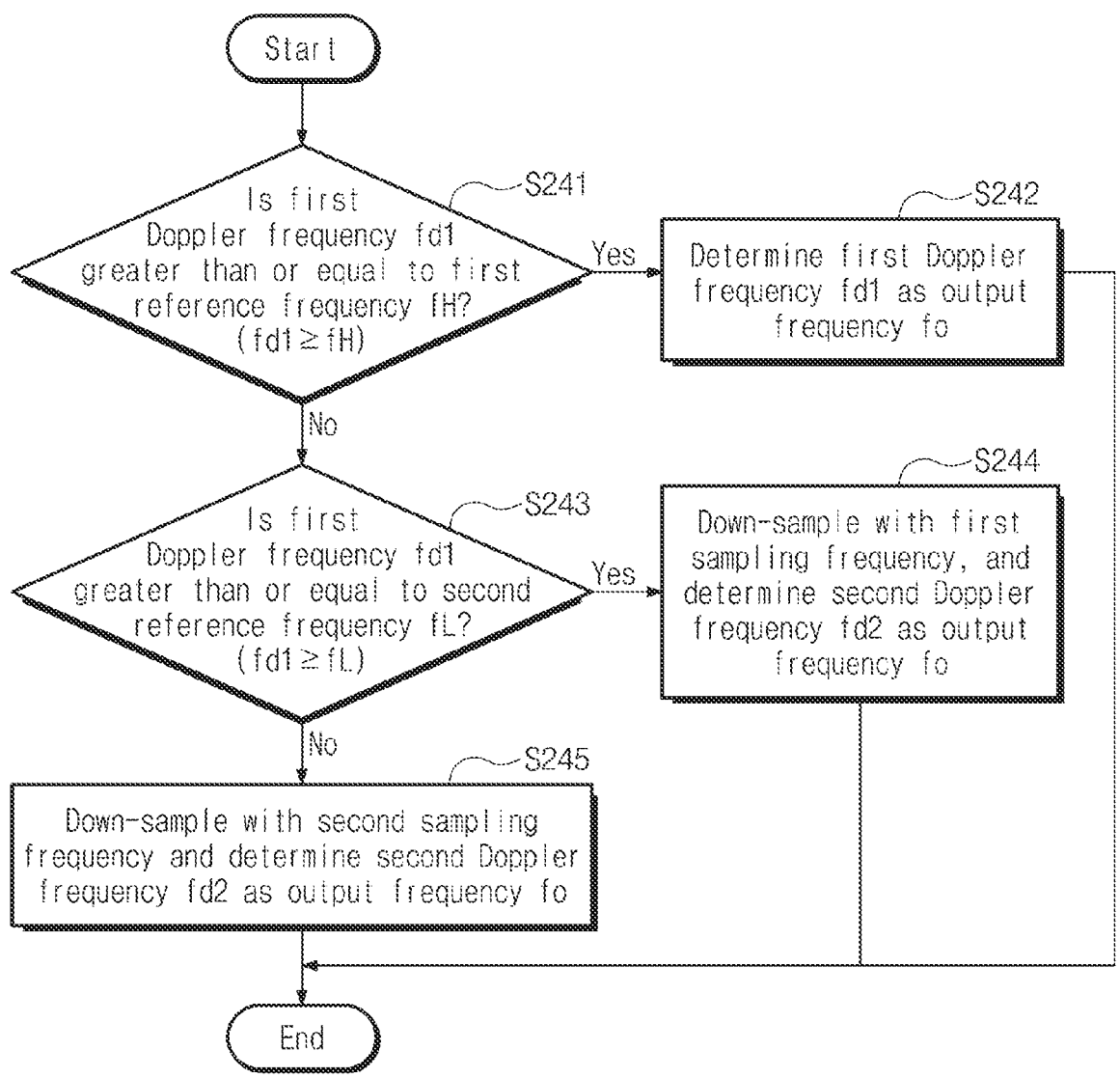
FIG. 10 is a flowchart illustrating down sampling and fast Fourier transform operations of a flow sensor according to an embodiment of the present disclosure.

FIG. 10 is a flowchart illustrating down sampling and fast Fourier transform operations of a flow sensor according to an embodiment of the present disclosure. Referring to FIG. 10, the down sampling and fast Fourier transform operations of the flow sensor are described. The flowchart of FIG. 10 may embody operation S140 of the flowchart of FIG. 9 according to some embodiments.

In operation S241, the flow sensor may compare whether the first Doppler frequency fd1 is greater than or equal to the first reference frequency fH. When it is determined in operation S241 that the first Doppler frequency fd1 is greater than or equal to the first reference frequency fH, the flow sensor may perform operation S242. In operation S242, the flow rate sensor may determine the first Doppler frequency fd1 as the output frequency fo. When it is determined in operation S241 that the first Doppler frequency fd1 is less than the first reference frequency fH, the flow sensor may perform operation S243. In operation S243, the flow sensor may compare whether the first Doppler frequency fd1 is greater than or equal to the second reference frequency fL. In this case, the second reference frequency fL may be less than the first reference frequency fH.

When it is determined in operation S243 that the first Doppler frequency fd1 is greater than or equal to the second reference frequency fL, the flow sensor may perform operation S244. In operation S244, the flow sensor may down-sample the predetermined number of samples with the first sampling frequency. The flow sensor may generate the second Doppler frequency fd2 based on the first and second digital signals, the number of down-sampled samples, and a second time period longer than the first time period. The flow sensor may determine the second Doppler frequency fd2 as the output frequency fo.

When it is determined in operation S243 that the first Doppler frequency fd1 is less than the second reference frequency fL, the flow sensor may perform operation S245. In operation S245, the flow sensor may down-sample the predetermined number of samples with the second sampling frequency. In this case, the second sampling frequency may be greater than the first sampling frequency of operation S243. The flow sensor may generate the second Doppler frequency fd2 based on the first and second digital signals, the number of down-sampled samples, and a second time period longer than the first time period. The flow sensor may determine the second Doppler frequency fd2 as the output frequency fo.

Figure 11:
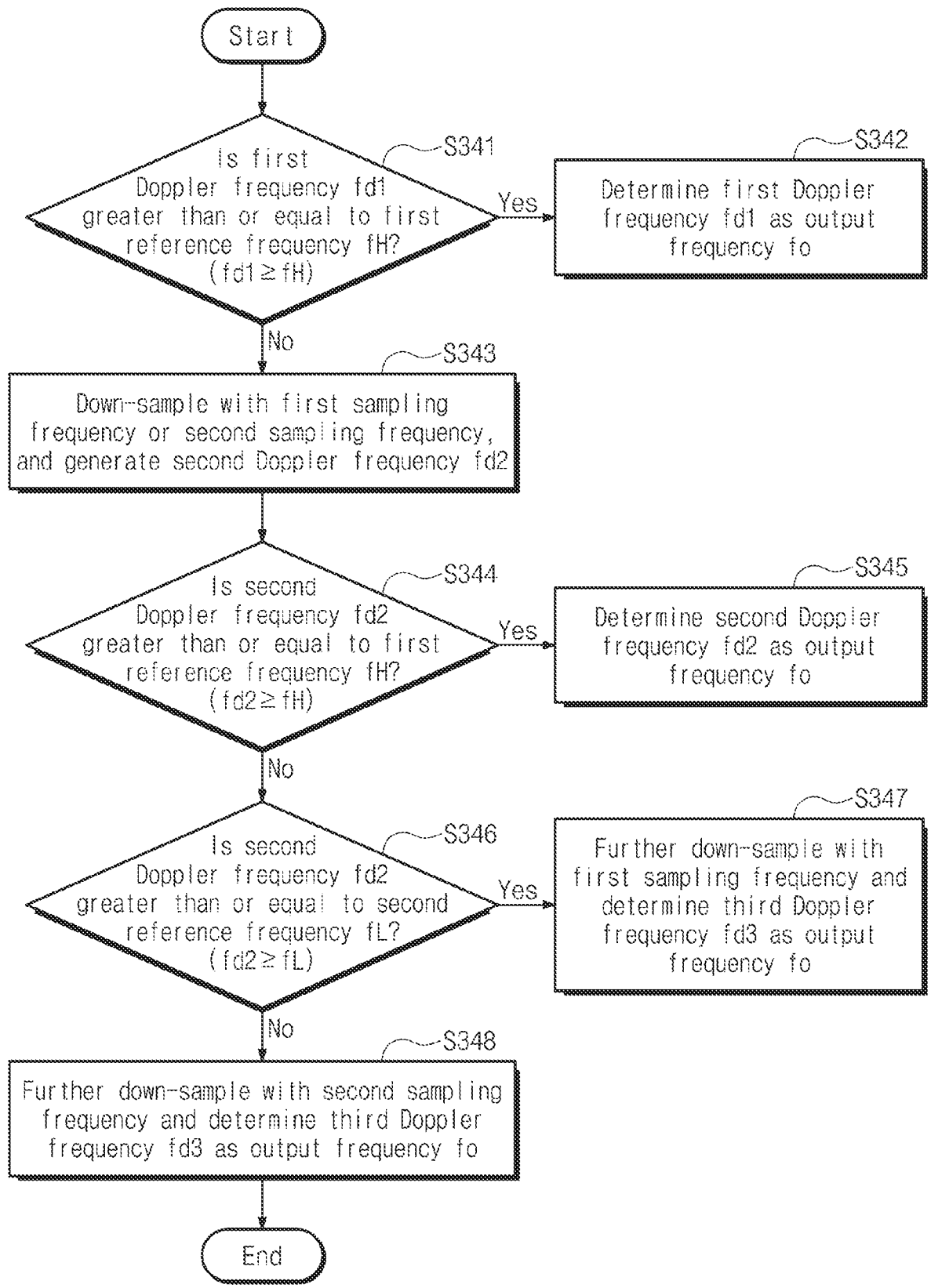
FIG. 11 is a flowchart illustrating down sampling and fast Fourier transform operations of a flow sensor according to another embodiment of the present disclosure.

FIG. 11 is a flowchart illustrating down sampling and fast Fourier transform operations of a flow sensor according to an embodiment of the present disclosure. Referring to FIG. 11, the down sampling and fast Fourier transform operations of the flow sensor are described. The flowchart of FIG. 11 may embody operation S140 of the flowchart of FIG. 9 according to some other embodiments. S341 and S342 are similar to S241 and S242 of FIG. 10, and S343 is similar to S243, S244, and S245 of FIG. 10, and thus detailed description thereof will be omitted.

In operation S341, the flow sensor may compare whether the first Doppler frequency fd1 is greater than or equal to the first reference frequency fH. When it is determined in operation S341 that the first Doppler frequency fd1 is greater than or equal to the first reference frequency fH, the flow sensor may perform operation S341. In operation S342, the flow sensor may determine the first Doppler frequency fd1 as the output frequency fo. When it is determined in operation S341 that the first Doppler frequency fd1 is less than the first reference frequency fH, the flow sensor may perform operation S343. After performing operation S343, the flow sensor may perform operation S344.

In operation S344, the flow sensor may compare whether the second Doppler frequency fd2 is greater than or equal to the first reference frequency fH. When it is determined in operation S344 that the second Doppler frequency fd2 is greater than or equal to the first reference frequency fH, the flow sensor may perform operation S345. In operation S345, the flow sensor may determine the second Doppler frequency fd2 as the output frequency fo. When it is determined in operation S344 that the second Doppler frequency fd2 is less than the first reference frequency fH, the flow sensor may perform operation S346. In operation S346, the flow sensor may compare whether the second Doppler frequency fd2 is greater than or equal to the second reference frequency fL.

When it is determined in operation S346 that the second Doppler frequency fd2 is greater than or equal to the second reference frequency fL, the flow sensor may perform operation S347. In operation S347, the flow sensor may further down-sample the number of down-sampled samples with the first sampling frequency. The flow sensor may generate the third Doppler frequency fd3 based on the first and second digital signals, the number of further down-sampled samples, and the second time period longer than the first time period. The flow sensor may determine the third Doppler frequency fd3 as the output frequency fo.

When it is determined in operation S346 that the second Doppler frequency fd2 is less than the second reference frequency fL, the flow sensor may perform operation S348. In operation S348, the flow sensor may further down-sample the number of down-sampled samples with the second sampling frequency. The flow sensor may generate the third Doppler frequency fd3 based on the first and second digital signals, the number of further down-sampled samples, and the second time period longer than the first time period. The flow sensor may determine the third Doppler frequency fd3 as the output frequency fo.

According to an embodiment of the present disclosure, a flow sensor for performing a multiple level down sampling and a method of operating the same are provided.

In addition, according to some embodiments of the present disclosure, a flow sensor with improved accuracy and calculation speed of a flow rate measurement and an operating method thereof are provided by performing a multiple level down sampling and at least one Fourier transform.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A method of operating a flow sensor, the method comprising:
    receiving an ultrasonic signal reflected from a particle;
    generating first and second digital signals based on the ultrasonic signal;
    generating a first Doppler frequency based on the first and second digital signals, a predetermined number of samples, and a first time period;
    comparing the first Doppler frequency with a second reference frequency less than a first reference frequency, when the first Doppler frequency is less than the first reference frequency;
    down-sampling the predetermined number of samples to a first sampling frequency or a second sampling frequency greater than the first sampling frequency, based on a result of the comparison;
    generating a second Doppler frequency based on the first and second digital signals, the number of down-sampled samples, and a second time period longer than the first time period;
    determining an output frequency based on the second Doppler frequency when the first Doppler frequency is less than the first reference frequency; and
    obtaining flow information of the particle based on the output frequency.

2. The method of claim 1, wherein the down-sampling of the predetermined number of samples to the first sampling frequency or the second sampling frequency greater than the first sampling frequency, based on the result of the comparison includes:

determining whether the first Doppler frequency is greater than or equal to the second reference frequency;

down-sampling the predetermined number of samples to the first sampling frequency when it is determined that the first Doppler frequency is greater than or equal to the second reference frequency; and down-sampling the predetermined number of samples to the second sampling frequency when it is determined that the first Doppler frequency is less than the second reference frequency.

3. The method of claim 1, further comprising:
determining the first Doppler frequency to the output frequency when the first Doppler frequency is greater than or equal to the first reference frequency.

4. The method of claim 1, wherein the determining of the output frequency, based on the second Doppler frequency when the first Doppler frequency is less than the first reference frequency includes:
determining whether the second Doppler frequency is greater than or equal to the first reference frequency; and
determining the second Doppler frequency as the output frequency when it is determined that the second Doppler frequency is greater than or equal to the first reference frequency.

5. The method of claim 1, wherein the determining of the output frequency, based on the second Doppler frequency when the first Doppler frequency is less than the first reference frequency includes:
determining whether the second Doppler frequency is greater than or equal to the first reference frequency;
comparing the second Doppler frequency with the second reference frequency when it is determined that the second Doppler frequency is less than the first reference frequency;
further down-sampling the number of down-sampled samples to the first sampling frequency or the second sampling frequency, based on a result of the comparison of the second Doppler frequency;
generating a third Doppler frequency based on the first and second digital signals, the number of further down-sampled samples, and a third time period longer than the second time period; and
determining the third Doppler frequency as the output frequency when the second Doppler frequency is less than the first reference frequency.

6. The method of claim 1, wherein the predetermined number of samples is an integer multiple of the first sampling frequency and the second sampling frequency.

7. The method of claim 1, wherein the generating of the first and second digital signals based on the ultrasonic signal includes:
generating the first digital signal based on an in-phase signal of the ultrasonic signal; and
generating the second digital signal based on a quadrature phase signal of the ultrasonic signal.

8. The method of claim 7, wherein the generating of the first digital signal based on the in-phase signal of the ultrasonic signal further includes removing a high-frequency component of the in-phase signal, and
wherein the generating of the second digital signal based on the quadrature phase signal of the ultrasonic signal further includes removing a high-frequency component of the quadrature phase signal.

9. The method of claim 1, wherein the generating of the first Doppler frequency based on the first and second digital signals, the predetermined number of samples, and the first time period includes:
forming a complex number using the first and second digital signals;
sampling the complex number with the predetermined number of samples; and
generating the first Doppler frequency by fast Fourier transforming the sampled complex number.

10. The method of claim 1, wherein the generating of the second Doppler frequency based on the first and second digital signals, the number of down-sampled samples, and a second time period longer than the first time period includes:
generating the second Doppler frequency based on samples corresponding to the second time period and dummy samples corresponding to a third time period after the second time period; and
wherein, each of the dummy samples has a specific value.

11. A flow sensor comprising:
a transceiver configured to receive an ultrasonic signal reflected from a particle;
a signal processor configured to generate first and second digital signals based on the ultrasonic signal;
a Doppler frequency calculator configured to generate an output frequency based on the first and second digital signals; and
a flow rate calculator configured to obtain flow information of the particle based on the output frequency, and
wherein the Doppler frequency calculator is further configured to:
generate a first Doppler frequency based on the first and second digital signals, a predetermined number of samples, and a first time period;
compare the first Doppler frequency with a second reference frequency less than the first reference frequency, when the first Doppler frequency is less than the first reference frequency;
down-sample the predetermined number of samples to a first sampling frequency or a second sampling frequency greater than the first sampling frequency, based on a result of the comparison;
generate a second Doppler frequency based on the first and second digital signals, the number of down-sampled samples, and a second time period longer than the first time period; and
determine the output frequency based on the first and second Doppler frequencies.

12. The flow sensor of claim 11, wherein the Doppler frequency calculator is further configured to:
down-sample the predetermined number of samples to the first sampling frequency when the first Doppler frequency is less than the second reference frequency and is greater than or equal to the second reference frequency; and
down-sample the predetermined number of samples to the second sampling frequency when the first Doppler frequency is less than the second reference frequency.

13. The flow sensor of claim 11, wherein the Doppler frequency calculator is further configured to:
determine the first Doppler frequency as the output frequency when the first Doppler frequency is greater than or equal to the first reference frequency; and
determine the output frequency based on the second Doppler frequency when the first Doppler frequency is less than the first reference frequency.

14. The flow sensor of claim 13, wherein, when the first Doppler frequency is less than the first reference frequency, the Doppler frequency calculator is further configured to:
- determine whether the second Doppler frequency is greater than or equal to the first reference frequency;
- compare the second Doppler frequency with the second reference frequency when it is determined that the second Doppler frequency is less than the first reference frequency;
- further down-sample the number of down-sampled samples to the first sampling frequency or the second sampling frequency, based on a result of the comparison of the second Doppler frequency;
- generate a third Doppler frequency based on the first and second digital signals, the number of further down-sampled samples, and a third time period longer than the second time period; and
- determine the third Doppler frequency as the output frequency when it is determined that the second Doppler frequency is less than the first reference frequency.

* * * * *